July 5, 1938.  N. SCHNOLL  2,122,756
ELECTROLYTIC CONDENSER
Filed Sept. 11, 1935  3 Sheets-Sheet 1
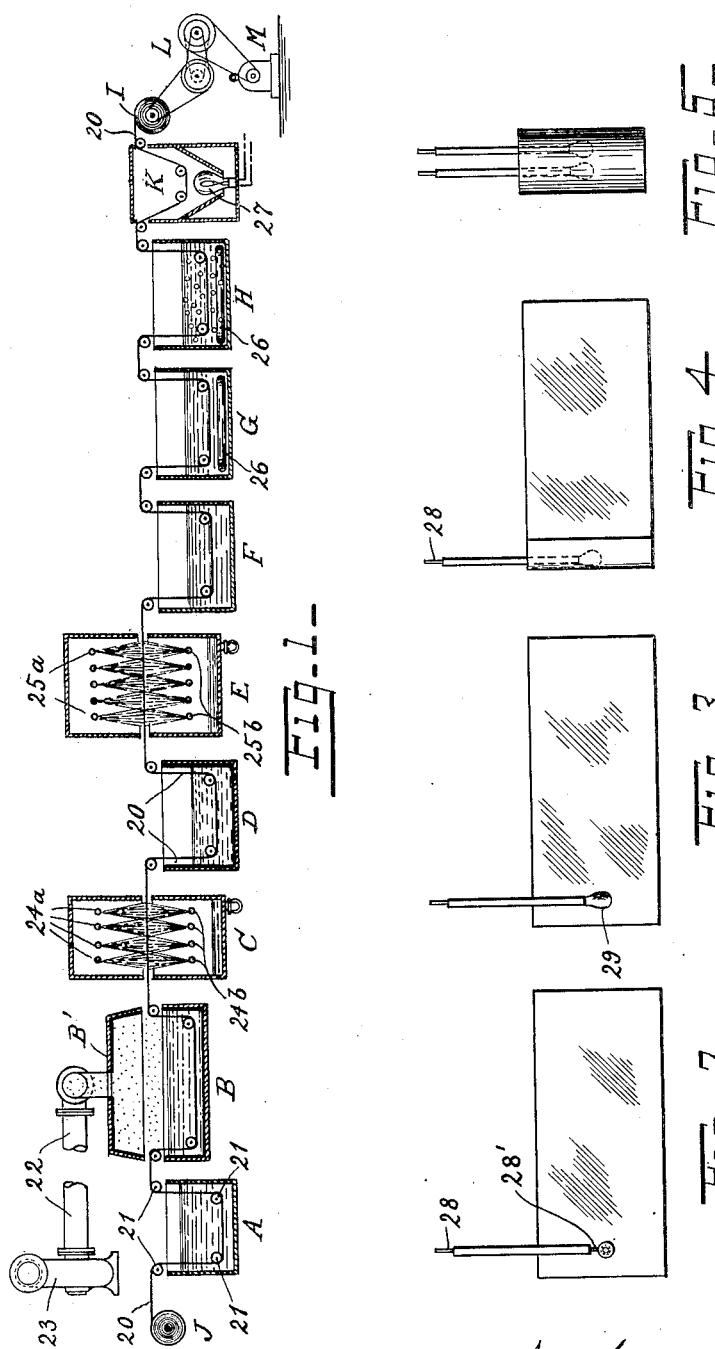
INVENTOR.
Nathan Schnoll
BY
his ATTORNEYS July 5, 1938.  N. SCHNOLL  2,122,756
ELECTROLYTIC CONDENSER
Filed Sept. 11, 1935   3 Sheets-Sheet 2
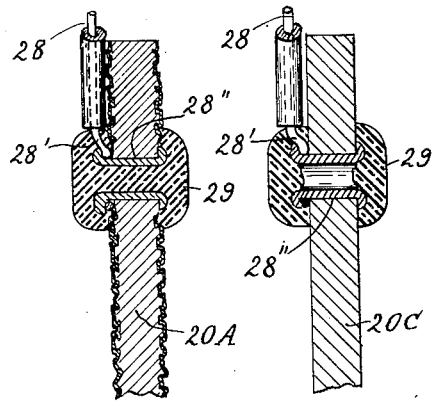
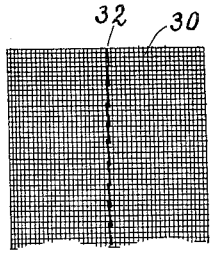
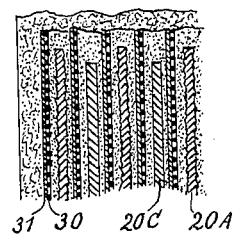
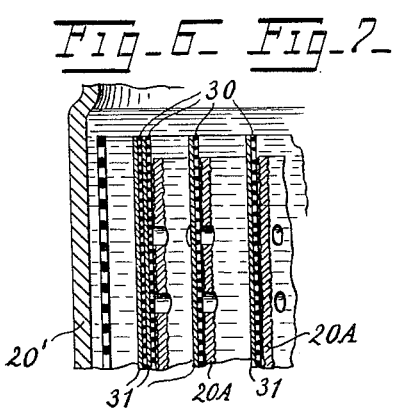
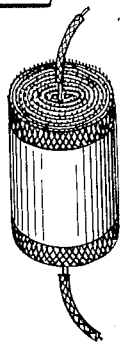
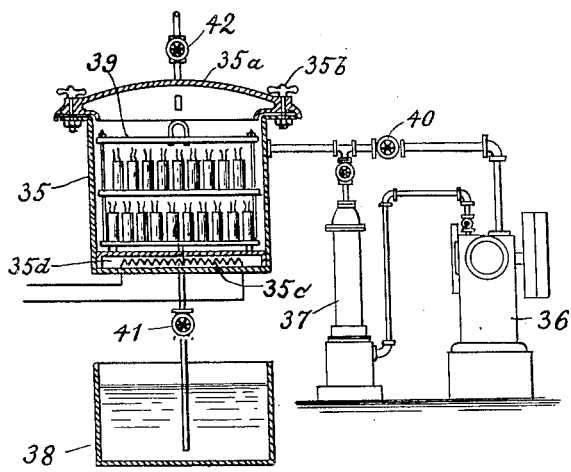
INVENTOR.
Nathan Schnoll
BY Schecht & Lotsch
his ATTORNEYS.

July 5, 1938.  N. SCHNOLL  2,122,756
ELECTROLYTIC CONDENSER
Filed Sept. 11, 1935  3 Sheets-Sheet 3

INVENTOR.
Nathan Schnoll
BY Schechter Lotsch
his ATTORNEYS

Patented July 5, 1938

2,122,756

UNITED STATES PATENT OFFICE 2,122,756

ELECTROLYTIC CONDENSER

Nathan Schnoll, New York, N. Y., assignor to Solar Manufacturing Corporation, a corporation of New York Application September 11, 1935, Serial No. 40,058

5 Claims. (Cl. 175—315)

This invention relates broadly to improvements in electrolytic condensers, comprising film-forming electrodes, and it applies equally well to wet, semi-liquid and so-called dry electrolytic condensers. These devices are especially useful for appliance in radio apparatus as "smoothing" condensers for eliminating the ripple in rectified alternating current. Electrolytic condensers of the character herein referred to, no matter whether they be liquid, semi-liquid or dry, always comprise three main elements,—the electrolyte, which is more or less liquid or even consists of a semi-dry paste, mostly, though not necessarily, consisting of a diluted borax or boric acid solution to which certain glutinous ingredients may be admixed, and two kinds of electrodes immersed or imbedded into the electrolyte, one of which at least must possess a "film-forming unidirectional quality", i. e. must be a metal covered with a chemical compound (usually an oxide film) which in conjunction with the electrolyte permits the passage of the current in one direction and obstructs its passage in the opposite direction. Metals which present this quality to a pronounced degree are aluminum and tantalum. This electrode which therefore acts like a one-way electrical valve furnishes the anode or positive contact to the electrical circuit in which the respective condenser is used, while the other electrode, called the cathode or negative contact, should not be "film-forming" and was previously therefore made of a "non-filming metal", like copper or nickel. The present practice, however, has found it expedient and more economical to likewise employ a cheaper metal, like aluminum, for the cathode and employs various ways and means to prevent or at least minimize the formation of a unidirectional film upon said cathode. But as this invention is not primarily concerned with the treatment and preparation of the cathode, we will for the present objects and purposes waive all considerations concerning the surface treatment or composition of the cathode and assume for the sake of simplicity that the latter is made of aluminum with a non-filming surface.

This invention therefore, as already indicated, is primarily concerned with improvements referring to the aluminum anode of electrolytic condensers, and in particular, it provides a preparatory treatment of the foil of which these anodes are made.

As is well known, the capacity of electrolytic condensers depends upon the active surface area of the anode, rather than upon the area of the cathode, except when such condensers are especially used as A. C. condensers in which case both the electrodes, one of which in the case of wet electrolytic condensers of this type, often represents the container, are provided with a unidirectional film, so that when the current reverses its polarity, the initial anode and cathode reverse their function, and in this exceptional case of course the capacity depends upon the areas of both electrodes. Although this case would logically also come within the scope of the present invention, its consideration can well be omitted, as the proper application of the principles of the present inventive concept easily can be made by analogy.

The guiding principle of the new invention is the artificial increase of the surface area of the anode which may be accomplished either by mechanical means (corrugating, roughening or sandblasting the surface) or by chemical treatment, which in itself is not unknown, and it is obvious that if by the latter method, which recommends itself by its low cost and quickness of operation, the active area of the anode can be increased from about ten to about two hundred percent, condensers of extraordinarily small bulk per unit of capacity can be built very cheaply.

Although a chemical treatment of the anode foil, in order to artificially increase its area, has been employed before, I have improved upon the choice of ingredients used, the sequence of operations, and the washing methods in such a way that a more uniform, better and also quicker result is attained. Moreover, the improved method of treatment actually facilitates the subsequent preforming of the anode, that is, the formation of the unidirectional oxide film, as will be shown hereafter.

When roll type condensers are made with one or both electrodes having undergone a preparatory chemical treatment, which essentially consists in an etching process, to increase their active area, there appears several subsequent difficulties which this present invention has been able to cope with and effectually eliminate.

The greatest difficulty is to obtain an intimate electrical low resistance contact with the entire effective surface area of the etched foil.

The usual method of partly separating an edge strip at the end of the electrode foil, folding it over and using the still coherent strip as a terminal, often proves inadequate in practice on account of the necessarily weakened connection which easily separates under the influence of slow corrosion. My improved method of connecting separate leads to the electrode overcomes this drawback.

Another difficulty which becomes especially obvious with an electrolyte of a semi-dry or pasty consistency is to secure an intimate contact of said electrolyte with the entire surface area of the etched and preformed anode on account of the many gaps and crevices presented by the wrinkled and pitted etched surface which, as a view through a microscope will reveal, often shows undercut furrows and cavities, which in the case of so called dry condensers are not filled by the paste or even, in the case of wet condensers, may harbor air bubbles which form a non-conductive interstice, greatly reducing the effective area and thereby the capacity.

This difficulty is overcome by my impregnation method under vacuum, in cooperation with some auxiliary means forming a part of the initial etching and washing process. Thereby a maximum effective contact of the electrolyte with the available area of the anode is obtained. The ultimate effect of attaining a maximum efficiency and guarding against eventual breakdowns of the condensers is further advanced by the special constituency and preparation of the impregnating medium, as will be set forth.

Itemizing therefore the various features of the inventive concept, the separate objects contemplated are the following:

The first object of the invention is to provide an electrolytic condenser of small bulk per unit of capacity.

Another object of my invention is to artificially increase the initial surface area and therewith the capacitance of an electrolytic condenser by etching the anode surface.

A further object is to provide said anode with such surface conditions that the subsequent film formation will be more uniform and adhesive and facilitated generally.

Another object is to provide a suitable interlay between the adjacent layers of the condenser, be they only of the anode type or anode and cathode foils in alternate succession, said interlay to be adapted to absolutely prevent any possible contact or short circuit between the adjacent foils and on the other hand, i. e. especially in the case of spirally wound dry or semi-dry condensers, to also afford a secure support for the electrolytic paste.

Another object of my invention is to provide an improved method of conductively attaching terminal leads to the electrode foils of the anode as well as of the cathode.

A further object of my invention which applies to all types of condensers, having etched electrodes, either for the anode alone or for both anode and cathode, is to provide a new impregnation method which, though based on a well-known principle, that of impregnation under vacuum, is novel, as far as its combination with the etching of condenser foils is concerned.

A final object is to provide an improved recipe of a highly effective electrolyte and of the manner of applying it.

Other objects will appear from the detailed description of an embodiment of the present invention as illustrated for its successive steps by the accompanying drawings. It is to be understood, however, that the method of preparing the different component parts of the condensers, referred to, is not confined to the few mechanical and chemical agents listed, but that the process as well as the appliances used may be modified, and their sequence changed in many ways without departing from the underlying principles set forth, and that many changes within the scope of the invention are possible and applicable.

Reference may be had to the following drawings in which—

Fig. 1 is a diagrammatic layout of a plant for carrying out the described etching process;

Figs. 2 to 5 illustrate the different steps of an improved method for attaching the leads to the electrode foils, i. e.—

Fig. 2 shows a lead wrapped in an insulating cover and with its bare end riveted to the electrode foil;

Fig. 3 shows the second step, consisting of covering the riveted connection with pitch or a similar non-conductive protective material;

Fig. 4 shows the third step, consisting in doubling back the end of the foil over the lead wire and rivet so as to completely cover the joint.

Fig. 5 shows a pair of foils, both provided with a lead-in wire in the same manner, one foil laid upon the other (with a suitable non-conductive interlay between them) and spirally rolled into a cylinder, to form the main body of one standard form of dry condenser.

Fig. 6 illustrates in greatly exaggerated scale a section through the top of an anode foil, etched on both sides and covered with a unidirectional oxide film. Especially the cross section through the foil and the wrinkled and etched surface is disproportionately magnified, as it might appear when viewed under a microscope. It also shows the fastening of the lead by an eyelet rivet in detail.

Fig. 7 shows an analogous cross-section through the top of a cathode foil.

Fig. 8 shows a fragmentary strip of the gauze interlay to the reverse side of which a paper strip is sewed.

Fig. 9 is a cross section through the gauze and the adjoining paper strip, sewed together along the center line.

Fig. 10 is a transverse sectional view on a greatly enlarged scale through adjacent alternate layers of anode and cathode foils, as assembled in a dry condenser of the rolled type.

Fig. 11 is a fragmentary section through a spirally wound wet condenser, showing a portion of the container which serves as cathode and a few turns of the anode immersed in the electrolyte solution.

Fig. 12 shows the two foils of a dry condenser with a gauze and paper interlay between them, spirally wound into a cylindrical roll with the two terminal leads extending from either end respectively, in perspective view.

Fig. 13 shows the same spirally wound roll, pressed into a substantially rectangular form, also drawn in perspective.

Figure 15:
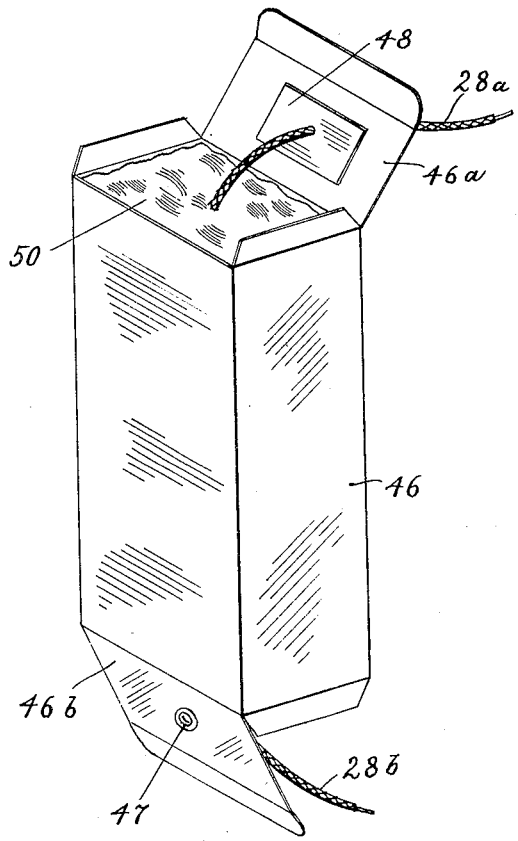

Fig. 14 depicts the vacuum apparatus in which the impregnation of the condensers takes place, together with the auxiliary appliances and the vacuum pump;

Fig. 15 illustrates how an electrolytic dry condenser, after being pressed into the flat rectangular form, shown in Fig. 13, and being manually or vacuum-impregnated, is covered with pitch or wax and finally "cased".

Figure 16:
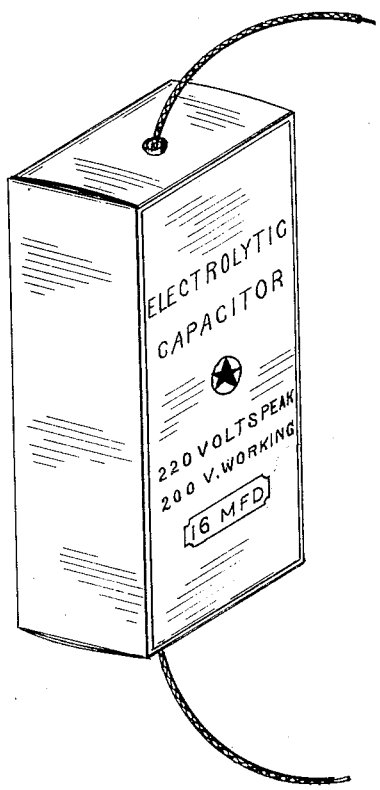

Fig. 16 shows a finished dry condenser of rectangular shape with the casing closed.

Figure 17:
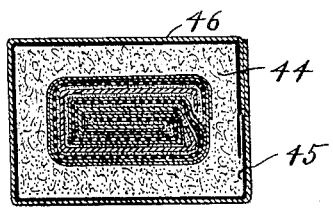

Fig. 17 is a horizontal cross section through the same condenser.

Similar reference numerals denote similar parts throughout the several views.

Referring more in detail to the drawings, Fig. 1 shows a series of tanks and hooded containers through which an endless foil of aluminum 20 is made to travel, immersed successively in different liquids and being sprayed on thereby. The material of the anode film to be etched is of the usual high grade purity (about 97 to 99.9% of aluminum) containing mostly iron as impurities but also a very small though highly objectionable percentage of copper. The aluminum foil consists either of a plain ribbon, especially when used for dry condensers, or this ribbon is provided with a plurality of regularly disposed perforations, when used as an anode for spirally wound wet condensers.

The foil 20 is unwound from a reel or coil J and is stretched over a multiplicity of transversely disposed cylinders or rollers 21, so arranged that they guide the foil passing over or under them into and through the various tanks and containers. The first tank A contains an alkaline bath, for example a 3% sodium hydroxide solution in water at about 40° C., to remove the grease or other external impurities from the foil surface. Instead of the above specified cleansing medium, I have also found a bath containing tri-chlorethylene just as effective.

Tank B contains the etching solution itself. This is dilute hydrochloric acid (25% of acid of 1.19 specific gravity) which is kept at an average temperature of about 80° C. A hood B' connected with a duct 22, leading to an exhaust fan 23, is installed over the tank B to remove the fumes, released by the etching process, and lead them off to the outer atmosphere or to other adequate disposal means. In order to obtain the best uniform results it is necessary to accurately control the speed of the foil, drawn through the bath, and to keep the strength of the acid as well as the temperature constant, as specified. A speed which keeps each point of the foil surface one minute in the bath will be found satisfactory.

Through this etching process in tank B, aluminum is selectively removed from the surface of the foil, due to the presence of metallic impurities which are not evenly alloyed with the aluminum, but on account of the partially crystalline structure of the aluminum are unevenly distributed. It is due to these local variations that the foil is roughened, pitted and minutely wrinkled by the etching, increasing thereby the exposed surface area, although a visual observation without the use of optical magnification seems to reveal only a dulled, grayish and slightly roughened surface.

After this etching the acid present on the foil surface is substantially removed by passing said foil through a spray chamber C between two series of nozzles 24a and 24b which spray city water upon both sides of the foil. The action of acids upon aluminum is different from the action of the same acids upon its metallic impurities. Whereas, for instance, hydrochloric acid easily attacks aluminum, changing it into aluminum chloride, there is hardly any reaction between cold sulphuric or nitric acid and aluminum while the reaction of these same acids upon iron or copper (the common impurities of aluminum) is almost the opposite. While therefore, as pointed out before, some aluminum has been selectively removed from the surface and some iron or copper particles may have been loosened or washed away, the greater part of the now exposed impurities remain substantially unattacked on the roughened surface.

The action of the next bath D which contains nitric acid (1 part of distilled water to 2 parts HNO₃ of 36° Bé.) is therefore indispensable if one desires to obtain a foil which forms a rapid and uniform film of unidirectional quality. This acid bath by removing the bared metallic impurities and therefore still increasing the available aluminous surface, which it leaves chemically unchanged, therefore tends to increase the result and capacity. Sulphuric acid has been found satisfactory for this operation to a certain degree but nitric acid is to be preferred on account of its rapid action upon copper particles which form the most injurious metallic impurity, not alone on account of their non-filming quality but also because their presence gives rise to local eddy currents which corrode the aluminum without contributing to the useful action of the condenser.

In the next spray chamber E the foil passes between the water nozzles 25a, 25b where it is thoroughly rinsed and cleaned of nitric acid and whatever sediments may adhere to the foil.

The three following baths, "F", "G" and "H" contain distilled water. At least one of these baths, preferably the last one, or G and H, are heated by a steam coil 26 or by an electro-thermic element from the outside or other heating means and the last bath H especially should be maintained at a temperature close to the boiling point (100° C.). The first two washing tanks remove any traces of acids from the foil, but in the third tank, as one may clearly observe, the hot water directly attacks the surface of the foil, placing a thin and abiding film thereon which probably consists of aluminum hydroxide. It has been found that the presence of this thin surface film, even in a dried condition, considerably facilitates the subsequent formation of the unidirectional dielectric film of the anode. If, however, the foil is permitted to remain for too long a period in contact with the hot water, the roughened surface is smoothed again (which incidentally confirms the existence of a chemical reaction between the hot water and the foil) and a loss in final capacity will result. In practice it was found that the foil should remain in active contact with the hot distilled water for from one-half to not more than ten minutes.

After the wet treatment of the foil, the latter is conducted through a drying chamber K where it is thoroughly and quickly dried by heat radiated from an electrical bulb 27 or through some other suitable drying means.

At the end of this film run, and about where the finished etched foil is wound up on a reel I, a driving mechanism for the foil propulsion is installed, actuated by a motor M, and its speed is controlled by means of a rheostat (not shown) which itself may be manually or automatically adjusted.

In addition thereto, a variable speed drive L (Reeve's drive or other suitable standard) to take care of the speed variation which the constantly increasing periphery of the reel I demands, can be installed with suitable controlling means, well known to those skilled in the art.

This completes the etching process for the anode foils for either dry or wet electrolytic condensers, and from the reel I the foil is transferred to the department where the dielectric film is formed upon the etched foil, as described later.

If it is desired, however, to use the etched foil as a cathode in an electrolytic condenser, the foil is not treated further after the etching process, the greatly increased area, due to the etching, in itself preventing or lessening the formation of a dielectric film. The reason seems to be that when A. C. current is used or the polarity is momentarily reversed, anodic film formation cannot take place until the current density per unit of electrode area surpasses a certain fixed value, and this current density is kept low by the artificial increase of the active area. The only modification in etching a cathode strip of foil consists in omitting the formation of the "water film". This may be accomplished by lowering the temperature of the distilled water in tanks G and H to ordinary room temperature or by passing the foil over these heated tanks instead of through them.

The forming of a dielectric film upon the anode foil by oxidizing it in a boric acid-borax bath through electrolytic action is common well-known practice and details of this process can be omitted, as no claim for any novel feature of this phase of manufacture is made, except that the formation of the "water film", as described, is claimed as a preparatory and auxiliary step of great advantage to a quicker and more uniform formation of the dielectric film.

After the anode foil is etched and dielectrically preformed, the anode, and in case of rolled dry or semi-dry condensers, also the cathode foil, is cut to proper length and the next task is to attach the leads in a permanent and efficient manner without introducing undue contact resistance. This is illustrated in Figs. 2 to 7. The bared end 28' of an insulated wire 28 is riveted to the foil, close to one end by an aluminum eyelet or rivet 28'', as shown in Fig. 2 and in larger scale in Figs. 6 and 7. A drop of pitch 29 or similar non-conductive compound is then applied over the rivet, on both sides of the foil, so as to completely cover and protect any bare metallic spot of the lead-in connection. As the pitch, when applied, usually drifts through the hollow shank of the eyelet rivet as shown in Fig. 6, forming a junction with the pitch layer on the opposite side of the foil, this anchors both sides of the pitch covering firmly to the foil surface, preventing any spontaneous peeling off. Both cathode and anode foils are connected to their respective leads in the same way. This form of connection does away with the necessity of an aluminum soldering joint which is unreliable and weak at its best. The end of the foil between the terminal wire and the extreme edge is then folded over against the wire (see Fig. 4) and thus fully covers and protects the connection, without taking up much more space than would be required if the terminal were formed by a partly separated and folded-over end strip of the foil itself, as mentioned before.

The latter method is especially objectionable for etched electrodes as the terminal pieces, being integral with the uncut foil, are apt to be fragile due to the etching and would also result in considerable foil loss since the external portion of the tabs contributes nothing to the capacity of the condenser. Separate leads with reliable and firm connections with little contact resistance are therefore a necessity for this type of condensers with etched foils.

Wax impregnated insulation of the terminal wires, except for the bare ends which are clamped under the rivet heads, prevents absorption of the electrolyte by the leads and incidental corrosion.

The intermediate non-conductive layer between foils of opposite polarity comprises a strip of gauze 30 which forms a retentive support for the electrolytic paste and to which a strip of soft porous absorptive paper 31 is sewed along the middle line by a loop-stitch seam 32, as Figs. 8 and 9 indicate. The width of both these intermediate strips is greater than that of the foils, to guard against any sparking over or short circuit between adjacent layers of foil. If gauze alone were used there would, especially in the case of tightly wound condensers, easily arise a possibility that two adjacent pliable foils, being impressed by the gauze, may by lateral deflections touch each other through the interstices of the gauze, if they happen to be wide enough or be drawn apart by lateral pressure; or what little space there may be left between, may be bridged over by sediment formed or, at any rate, not be sufficient to prevent short circuit. The additional layer of thin paper therefore prevents a short circuit in the condenser and a premature breakdown. As a rule there is only one strip of gauze with its adjacent paper layer required between two electrode sheets, but in condensers of higher voltage it is advisable to double the outer non-conductive layer, so that it comprises two gauze sheets, each with a paper strip attached to it.

The next step of the process of manufacturing condensers with etched foils and preformed films, namely that of impregnating them with an electrolyte solution, can be carried out in different ways, according to the ultimate purpose and the quality required. The cheapest way which does not give the best possible results but which nevertheless comes within the scope of this invention, as hitherto explained and set forth, is the usual way of rolling them by hand or on mechanically driven spindles or bobbins with an electrolytic paste manually spread out between the electrode foils. This electrolytic paste contains for example,—boric acid, ammonium hydroxide and enough ethylene glycol to make a substantial paste which can be spread evenly by a brush over both sides of a compound gauze and paper strip, this strip being cut somewhat longer than the foils which alternate therewith in the assembled condenser roll. In order to manufacture, for example, a spirally wound dry condenser, an etched and filmed anode foil with a terminal wire riveted to one end as shown in Fig. 4, is laid upon a compound gauze and paper strip, the latter being sewed together and covered with electrolytic paste, as indicated. This non-conductive interlay is larger in length as well as in width than the inlaid anode strip. Thereupon a cathode foil which has no preformed film and may not be etched, but has also a terminal wire riveted to one end, is likewise laid upon another compound gauze and paper strip, similarly covered with paste, the relative sizes of cathode and interlay strips being similar to those of the anode combination. Finally the anode pack is superimposed upon the cathode pack and both are rolled together upon a lathe-driven thin mandrel or bobbin from which the tightly wound roll is then stripped for further treatment. The two terminal wires are advantageously so arranged that they are attached to opposite ends of the electrode foils and protrude also from opposite ends of the finished cylindrical roll. The cylindrical shape of the wound roll can be flattened by a press into an approximately rectangular or oval shape, as Fig. 13 shows.

This manual method of impregnation has certain imperfections which are apparent already with the usual type of condensers as built hitherto and are greatly augmented in the case of electrodes with an etched and uneven surface, namely; a lack of uniform intimate minimum resistance contact of the electrolyte with the potentially effective surface of the foil. Even in the ordinary cases there are always gaps, filled with air or void spaces, caused by the subsequent contraction of the cooling impregnating medium, which means increased resistance and lessened capacity. These imperfections are overcome by impregnation under vacuum which therefore forms a component part of the present invention.

The apparatus used for this purpose is shown in Fig. 14. It consists essentially of a vacuum chamber 35, in the shape of a round tank with a lid 35a which can be tightly clamped thereon by hinged bolts 35b, and provided with facilities to heat the contacts, for example, an electric heating element 35c installed in a false bottom 35d, which is hermetically closed against the interior of the tank so that any liquid or air cannot seep into the space where the heating coil is installed. The vacuum pump is designated by 36 and 37 is a condenser for absorbing any moisture drawn by suction from the tank, while 38 is the storage tank for the electrolyte solution.

The condenser coils are wound and prepared in the usual way, as described before, but dry, without any application of paste or electrolyte. They may be kept closed temporarily by rubber bands or other preliminary means and are stacked upon a double rack 39 or a similar supporting frame. Then they are placed into the vacuum chamber 35, the lid is closed and the chamber is exhausted by the pump while the chamber is heated for about 30 minutes, the inside temperature being kept at 100° C. This treatment not only frees the contents of the chamber of most of the surrounding air and that inclosed between the adjacent layers of foil, but also of any moisture held by the fibers of the interlay or clinging to the film or surfaces of the foils, being precipitated in condenser 37. At the end of this period the valve 40 to the vacuum pump is closed and when the valve 41 is opened, the electrolyte solution, contained in the tank 38 is drawn into the vacuum tank, until it covers the tops of the uppermost rows of condensers in the rack 39. Then the valve 41 is shut off and for about one hour the temperature of 100° C. is maintained.

The electrolyte solution is similar to the one, specified before, but is more liquid and raised to a temperature of about 125° C. before it is used.

A suitable recipe for this solution is the following:

| | | |
|---|---|---|
| Boric acid | grams | 2000 |
| Ammonium hydroxide (28% NH₃) | ccm | 400 |
| Ethylene glycol | ccm | 1200 |

At the end of the heating period the heat is shut off, the air valve 42 is opened and air is admitted. This lets the surplus electrolyte drain back into the storage tank 38 and the contents of the vacuum tank are permitted to cool off. The liquid electrolyte which has filled all the crevices of the etched foil as well as the porous intervening spacers will harden during the cooling into a solid waxlike substance. Thus, by impregnation under vacuum, a condenser with low power factor and the highest possible capacity, without any voids or cracks in the insulation, is obtained.

After impregnation the condensers are aged in well known manner, then dipped in wax or pitch, wrapped in waterproof paper and encased in boxes in the regular way and finished for commercial use, as Figs. 15 to 17 indicate.

The dipping of the impregnated condenser in pitch (or asphalt) 44 is usually done before boxing the condenser, in a thorough manner so that it is thoroughly imbedded on all sides and a waterproof paper lining 45 is then wrapped around it.

The box 46 in which the dry condenser is finally encased, is the usual pasteboard carton, made of a single blank piece, pasted together along a longitudinal edge and provided with end flaps 46a and 46b, each having a metal eyelet 47, reinforced by a pasteboard washer 48 on the inside of the flap. The insulated terminal wires 28a and 28b are drawn through the eyelets, before the flaps are finally closed. All the remaining voids and crevices inside the box are previously filled with pitch or paraffin 50 so as to hermetically seal the condenser inside the closed envelope. Fig. 16 shows the finished dry condenser.

It will be evident that all the objects aforementioned have been attained in a simple, efficient and novel way, but it should be understood that this invention is not confined to the particular form shown and described, the same being merely illustrative, and that the invention can be carried out in other ways without departing from the spirit of my invention, and therefore, I claim broadly the right to employ all equivalent instrumentalities coming within the scope of the appended claims, and by means of which objects of my invention are attained and new results accomplished, as it is obvious that the particular embodiments herein shown and described are only some of many that can be employed to attain these objects and accomplish these results.

Having thus described my invention, what I claim and desire to secure by Letters Patent, is:

1. The combination with an electrolytic condenser comprising an anode foil, imbedded in an electrolyte; an insulated terminal wire, attaching means imbedded in the condenser body, said terminal wire connected electrically to said attaching means, said attaching means and any exposed parts of the terminal connections covered with a non-conductive substance.

2. In an electrolytic condenser having a foil electrode, a terminal connection, comprising a terminal wire, a hollow rivet inserted with intimate conductive contact through said foil within the body of the condenser, and clamping the bare end of said terminal wire to a faced spot of the foil, and an insulating covering applied to all exposed parts of the terminal connection and anchored in place by being passed through the hollow shank of the rivet.

3. The method of making terminal connections of separate terminal members with condenser foils, comprising riveting said members with hollow rivets to said foils within the body of the condenser, insulating the exposed parts of said riveting connections in such a way that the insulation is anchored to the foil by passing through said hollow rivets and protecting the rivet connection by enfolding it in said foil.

4. An electrolytic condenser comprising two foil electrodes, one of which at least is covered by a unidirectional dielectric film, and an interspacer between said foil electrodes, impregnated with an electrolytic paste, said interspacer consisting of gauze, adapted to retain said paste in its meshes and a sheet of soft porous and absorbent paper, sewed onto the gauze and adapted to prevent any direct contact of adjacent foils through the meshes of the gauze.

5. The combination with an electrolytic condenser comprising an anode foil imbedded in an electrolyte; an insulated terminal wire; attaching means embedded in the condenser body; said terminal wire connected electrically to said attaching means; said attaching means and any exposed parts of the terminal connections of non-film forming metal covered with a non-conductive substance.

NATHAN SCHNOLL.